US005086657A

United States Patent [19]

Wang et al.

[11] Patent Number: 5,086,657

[45] Date of Patent: Feb. 11, 1992

[54] ENGINE STARTING APPARATUS

[75] Inventors: Dazong Wang, Troy; Mazen M. Zahlan, Rochester, both of Mich.

[73] Assignee: General Motors Corporation, Detroit, Mich.

[21] Appl. No.: 688,211

[22] Filed: Apr. 22, 1991

[51] Int. Cl.[5] .................... F02N 15/06; F16D 23/10

[52] U.S. Cl. .................... 74/7 C; 74/7 A; 192/103 B; 192/104 C

[58] Field of Search .................... 74/7 A, 7 C, 7 E; 192/79, 103 B, 104 C, 105 CD

[56] References Cited

U.S. PATENT DOCUMENTS

| | | | |
|---|---|---|---|
| 1,017,126 | 2/1912 | Barenz | 192/104 C |
| 1,862,951 | 6/1932 | Bignand | 192/105 B |
| 1,864,256 | 6/1932 | Nardone | 74/7 C X |
| 1,973,288 | 9/1934 | Lansing | 74/6 X |
| 2,057,386 | 10/1936 | Linder | 192/76 |
| 2,427,346 | 9/1947 | Banker | 192/103 R |
| 2,464,675 | 3/1949 | Dodge | 192/104 R |
| 2,521,943 | 9/1950 | Pitt | 191/103 B |
| 2,640,359 | 6/1953 | Gilbert et al. | 74/7 C |
| 2,776,571 | 1/1957 | Simone | 74/7 C |
| 2,885,895 | 5/1959 | Troeger | 74/7 C |
| 3,258,095 | 6/1966 | Shelton | 192/103 B |
| 3,693,771 | 9/1972 | DeLancey | 192/105 CD |
| 3,724,622 | 4/1973 | Barbulesco et al. | 192/105 CE |
| 3,804,222 | 4/1974 | Reams | 192/103 B |
| 3,954,162 | 5/1976 | Densow | 192/105 CE |
| 3,971,462 | 7/1976 | Johansson | 192/105 BA |
| 4,187,728 | 2/1980 | Mazzorana | 74/7 A X |
| 4,586,467 | 5/1986 | Raver | 74/7 A X |
| 4,662,233 | 5/1987 | Mazzorana | 74/7 A |
| 4,687,085 | 8/1987 | Shimizu et al. | 192/89 W |

FOREIGN PATENT DOCUMENTS

| | | | |
|---|---|---|---|
| 976146 | 11/1982 | U.S.S.R. . | |
| 391548 | 10/1932 | United Kingdom | 192/104 C |

OTHER PUBLICATIONS

"Three Position Clutch Does It Automatically", Machine Design, Apr. 14, 1960, p. 174.

*Primary Examiner*—Allan D. Herrmann
*Assistant Examiner*—David W. Laub
*Attorney, Agent, or Firm*—Creighton R. Meland

[57] ABSTRACT

Engine starting apparatus for cranking an internal combustion engine. The engine is connected to a ring gear and the starting apparatus has a pinion that is meshed with the ring gear during engine cranking. The pinion is driven by an electric cranking motor. A speed responsive clutch is connected between the cranking motor and the pinion. The clutch is engaged during engine cranking to drive the pinion from the cranking motor. When the engine starts, the speed responsive clutch is disengaged to disconnect the cranking motor from the pinion. Clutch disengagement occurs in response to an increase in the speed of rotation of the clutch which occurs after the engine starts.

6 Claims, 1 Drawing Sheet

ENGINE STARTING APPARATUS

This invention relates to engine starting apparatus for cranking an internal combustion engine.

BACKGROUND OF THE INVENTION

Engine starting apparatus for cranking internal combustion engines can utilize a starter drive that has an over-running clutch. During engine cranking, the over-running clutch is driven by an electric cranking motor and the clutch drives a pinion that, in turn, drives the ring gear of an engine. When the engine starts, the clutch over-runs to thereby prevent the running engine from driving the electric cranking motor.

Engine starting apparatus that utilizes an over-running clutch can produce cranking noise particularly where the pinion is driven from the cranking motor through a gear speed reduction drive. The noise produced is impulsive and is the result of mechanical impact in the starter driveline to the engine. During engine cranking, the load torque due to the engine varies as the engine cylinders go through their compression or expansion strokes. Each time a cylinder begins its compression stroke, it creates a negative engine torque which tends to slow down the engine crankshaft and flywheel. As the piston in a cylinder travels through top dead center, it creates a positive torque which accelerates the flywheel. Due to the large effective inertia of the motor drive (the effective inertia is proportional to the square of the drive ratio), the cranking motor speed cannot follow the engine speed. Therefore, the engine overruns the over-running clutch until the next cylinder begins its compression stroke. This repetitive engaging and disengaging of the over-running clutch creates a noise producing mechanical impact.

SUMMARY OF THE INVENTION

It, accordingly, is an object of this invention to provide an engine starting apparatus that does not utilize an over-running clutch to thereby provide a starting apparatus that does not produce impact noise of the type associated with the use of over-running clutches. Instead of using an over-running clutch that starting apparatus of this invention uses a speed responsive clutch that is connected between an electric cranking motor and the engine. During engine cranking, the speed responsive clutch remains engaged thereby cranking the engine from the cranking motor. Once the engine starts and engine speed attains a certain value, the clutch is operated automatically in response to a predetermined engine speed to disconnect or disengage the cranking motor from the engine.

DETAILED DESCRIPTION OF THE INVENTION

Figure 1:
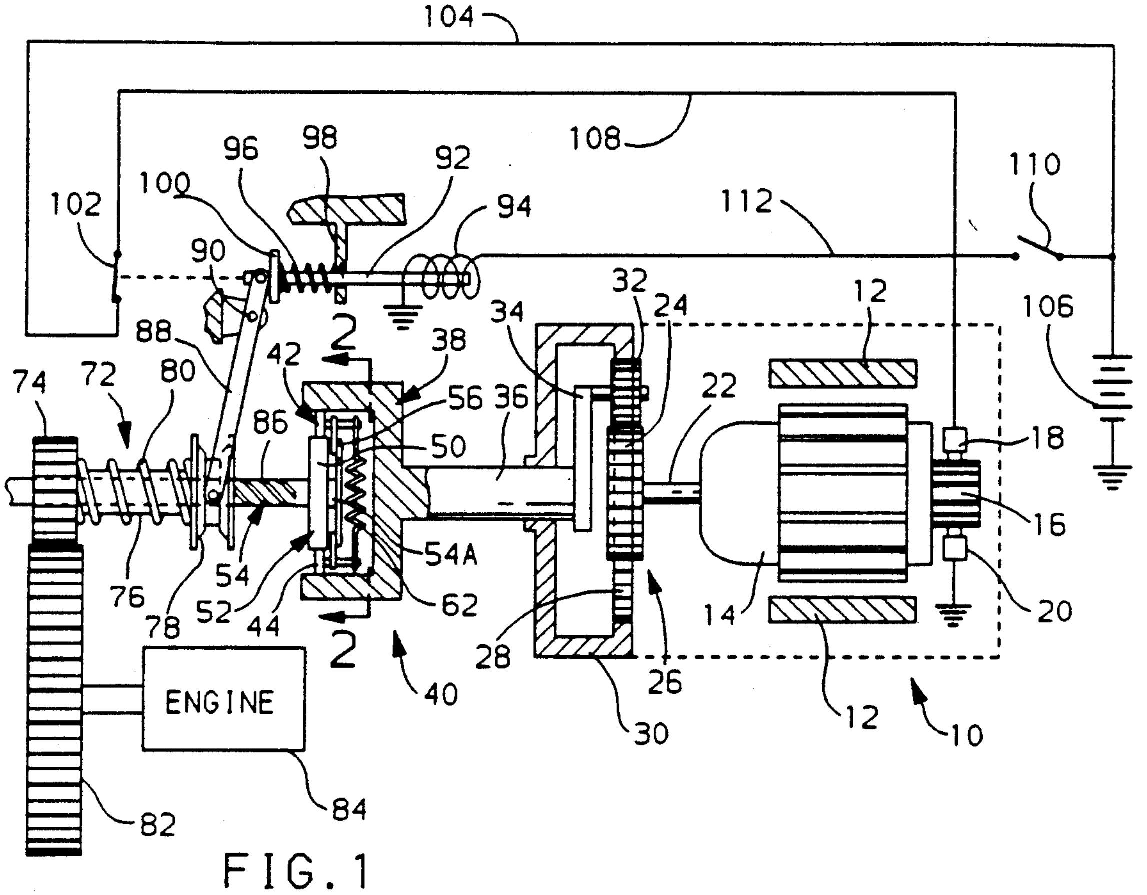
FIG. 1 illustrates an engine starting apparatus made in accordance with this invention.

Referring now to the drawings and more particularly to FIG. 1, the reference numeral 10 designates a direct voltage permanent magnet electric cranking motor. The cranking motor has permanent magnets 12 for producing field flux and a rotatable armature 14 having an armature winding connected to a commutator 16.

The commutator 16 engages brushes 18 and 20. The armature 14 has an output shaft 22.

The shaft 22 drives a sun gear 24 of a planetary gear set 26. This gear set includes a ring gear 28 carried by housing 30 and a planet gear 32. Planet gear 32 meshes with ring gear 28 and with sun gear 24. Planet gear 32 rotates on a part of a planet carrier 34 that is connected to a shaft 36. The gear speed ratio of the planetary gear set 26 is such that the shaft 36 rotates at a speed that is lower than the speed of rotation of shaft 22 when shaft 22 is driving shaft 36. Conversely, if shaft 36 drives shaft 22, shaft 22 will rotate at a higher speed than the speed of rotation of shaft 36. The difference in speeds is a function of the magnitude of the gear reduction ratio of gear set 26. The housing 30 for gear set 26 can be attached to a housing (not illustrated) of cranking motor 10.

Figure 2:
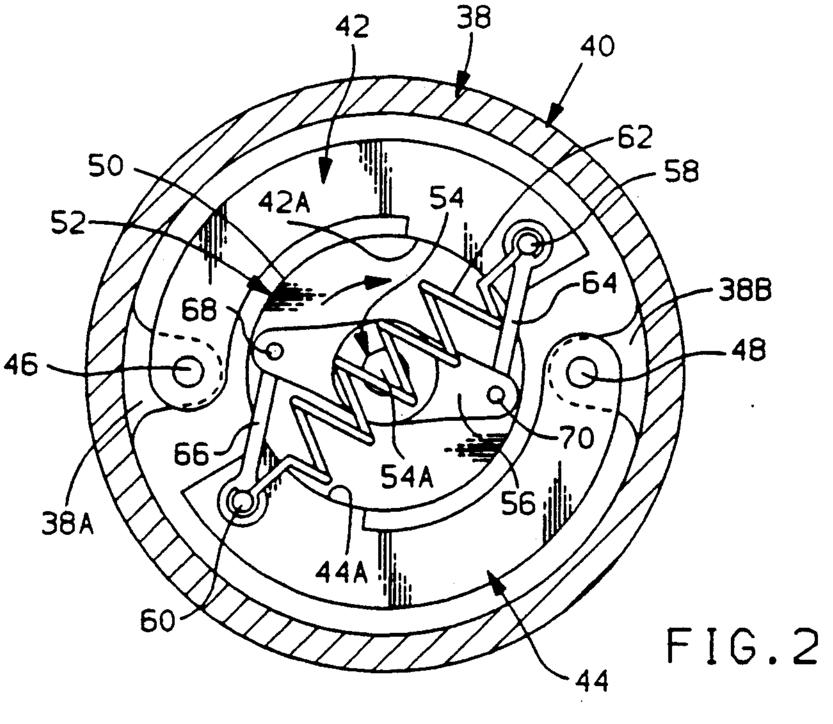
FIG. 2 is an enlarged sectional view taken along line 2—2 of FIG. 1.

Shaft 36 is connected to a hollow circular drum 38 which forms one part of a speed responsive clutch generally designated as 40. This clutch is best illustrated in the enlarged sectional view of FIG. 2. As shown in FIG. 2, clutch 40 comprises two flyweights 42 and 44. Flyweight 42 is pivotally supported by a pin 46 that is fixed to flange portion 38A of drum 38. Flyweight 44 is pivotally supported by a pin 48 that is fixed to flange portion 38B of drum 38.

Flyweight 42 has an arcuate clutch surface 42A that is shown engaging a portion of the outer annular surface 50 of a circular disk member 52. Flyweight 44 has an arcuate clutch surface 44A that likewise engages a portion of outer surface 50 of disk 52. The outer surface 50 and surfaces 42A and 44A have a suitable clutch friction material which has not been illustrated.

The disk 52 is rigidly connected to a shaft 54. One end 54A of shaft 54 pivotally supports a part 56. The flyweight 42 carries a pin 58 and flyweight 44 carries a pin 60. A tension spring 62 has its opposite ends connected respectively to pins 58 and 60. It can be seen that spring 62 forces flyweight surfaces 42A and 44A into engagement with portions of the with outer surface 50 of disk 52.

The clutch 40 further has two links or arms 64 and 66. Arm 66 is pivotally connected to pin 60 and is pivotally connected to a pin 68 carried by part 56. In a similar fashion, arm 64 is pivotally connected to pin 58 and is pivotally connected to a pin 70 carried by part 56.

The shaft 54 extends through a starter drive generally designated as 72. This starter drive comprises a pinion 74, a sleeve 76 rigidly connected to pinion 74, a shift collar 78 and a so-called jump spring or pinion engaging spring 80 interposed between pinion 74 and shift collar 78. In FIG. 1, pinion 74 is shown in mesh with a ring gear 82 of an engine 84. The sleeve 76 has internal helical splines (not illustrated) that mesh with helical splines 86 on shaft 54.

Shift collar 78 can be shifted by a shift lever 88 that pivots about a fixed pivot pin 90. One end of shift lever 88 is connected to an armature or plunger 92 of a solenoid that includes a solenoid coil winding 94. A compression spring 96 is interposed between a fixed member 98 and a washer 100 that engages one end of lever 88. Spring 96 tends to move lever 88 in counter-clockwise direction about pin 90.

The armature or plunger 92 operates the movable contact of a switch 102. One side of switch 102 is connected to a conductor 104 that is connected to the positive side of storage battery 106. The opposite side of switch 102 is connected to brush 18 of motor 10 by conductor 108. Brush 20 of motor 10 is grounded as is the negative side of battery 106.

One side of solenoid coil winding 94 is grounded and its opposite side is connected to one side of a manually operable start switch 110 by conductor 112. The opposite side of start switch 110 is connected to battery 106.

The operation of the starting apparatus of this invention will now be described beginning with a description of how the pinion 74 is meshed and pulled out of mesh with ring gear 82. When switch 110 is closed, coil 94 is energized to move plunger 92 to the right to cause shift lever 88 to be moved clockwise thereby moving shift collar 78, sleeve 76 and pinion 74 to the left in FIG. 1. The movement of collar 78 imparts movement to pinion 74 and sleeve 76 through spring 80. As sleeve 76 is moved, it and pinion 74 rotate slightly due to helical splines 86. If no end tooth abutment occurs between pinion 74 and ring gear 82, pinion 74 is forced into mesh with ring gear 82. If end tooth abutment should occur, jump spring 80 is compressed and allowing lever 88 to move and eventually spring 80 will force pinion 74 into meshing engagement with ring gear 82.

When the pinion 74 becomes meshed with ring gear 82, switch 102 closes to thereby energize cranking motor 110 to cause armature 14 to rotate. If end tooth abutment occurs, switch 102 can also close before pinion 74 becomes meshed with ring gear 82. Switch 102 is shown closed in FIG. 1 since pinion 74 is shown in mesh with ring gear 82. When switch 102 is closed, cranking motor 10 is energized.

When start switch 110 is opened, solenoid coil 94 is deenergized. Spring 96 now moves shift lever 88 counter-clockwise which, in turn, moves shift collar 78, sleeve 76 and pinion 74 to the right in FIG. 1 This action causes the pinion 74 to be moved out of mesh with ring gear 82. Switch 102 is opened by the movement of armature 92 to thereby deenergize motor 10 and accordingly engine cranking is terminated.

The operation of the speed responsive clutch 40 will now be described. Assume that the vehicle operator closes switch 110 to initiate engine cranking. When this happens, pinion 74 is moved into mesh with ring gear 82 and switch 102 closes thereby energizing cranking motor 10. Shaft 22 now drives shaft 36 and drum 38 of clutch 40 through gear speed reduction set 26. At this time, spring 62 of the clutch 40 forces the flyweight surfaces 42A and 44A into tight engagement with portions of surface 50 of disk 52. Torque is now transmitted to disk 52 and shaft 54 from drum 38 due to the frictional engagement between flyweight surfaces 42A and 44A and portions of surface 50. The force of spring 62 is such that during engine cranking, surfaces 42A and 44A remain engaged with surface 50 and accordingly clutch 40 remains engaged. Thus, until the speed of drum 38 attains a predetermined speed, the clutch 40 remains engaged. This predetermined speed is higher than the maximum speed of drum 38 during engine cranking and prior to starting of the engine.

When the engine 84 starts, it will drive the drum 38 of clutch 40 by way of ring gear 82, pinion 74, sleeve 76, shaft 54 disk 52 and the frictional engagement of surfaces 42A and 44A with portions of surface 50. When the engine starts, the speed of drum 38 increases and goes higher than the cranking speed. At a certain engine speed, corresponding to the fact that the engine has started and is running, drum 38 is rotated at such a speed as to cause the flyweights to move outwardly in FIG. 2 by centrifugal force to cause surfaces 42A and 44A to become separated from surface 50. Clutch 40 is now disengaged to disconnect shaft 36 from pinion 74 and accordingly the cranking motor 10 and pinion 74 are disconnected.

When clutch 40 disengages, as has been described, the speed of cranking motor armature 14 increases slightly and is high enough to cause drum 38 to be rotated at a speed that is high enough to maintain the clutch 40 disengaged. When the engine starts, the operator of the vehicle opens switch 110 to thereby cause pinion 74 to be pulled out of mesh with ring gear 82 and to cause switch 102 to open to deenergize motor 10.

To summarize the operation of clutch 40, it remains engaged during cranking of the engine 84 and becomes disengaged once the engine starts.

The starter drive 72 does not have an over-running clutch. Thus, the speed responsive clutch 40 is the only means for disconnecting the cranking motor 10 and pinion 74 when the engine starts.

This invention could be used in starting apparatus that does not have a gear reduction drive like gear set 26. If no gear reduction drive is used, shaft 22 would be directly connected to shaft 36. The use of the speed responsive clutch 40, instead of an over-running clutch, will be more beneficial in a system that uses a gear reduction drive because impact noise is more severe in a system that employs gear reduction.

The embodiments of the invention in which an exclusive property or privilege is claimed are defined as follows:

1. Starting apparatus for cranking an internal combustion engine comprising, an electric cranking motor, a shaft connected to the armature of said cranking motor, a ring gear connected to said engine, a pinion which is adapted to be meshed with the ring gear of said engine, a speed responsive clutch connected between said pinion and said shaft for connecting and disconnecting said shaft and pinion, said clutch comprising a first clutch member connected to said shaft to rotate therewith and a second clutch member connected to said pinion, said second clutch member having a portion thereof disposed within said first clutch member, at least one weight member connected to said first clutch member by means which permits said weight member to move radially inwardly toward or radially outwardly away from said portion of said second clutch member, and a spring for urging said weight member radially inwardly into clutching engagement with said portion of said second clutch member, the force of said spring being such as to maintain said weight member in clutching engagement with said portion of said second clutch member when said engine is being cranked by said cranking motor at cranking speed, said weight member being moved radially outwardly by centrifugal force against the force of said spring to a position where it does not engage said portion of said second clutch member when said engine starts and drives said first clutch member at a speed that is higher than the speed that it is driven during engine cranking.

2. The starting apparatus according to claim 1 where said shaft is connected to said armature through gear reduction gearing that causes said shaft to rotate at a slower speed than the speed of rotation of said armature when said armature is rotating to crank the engine.

3. The starting apparatus according to claim 1 which includes a solenoid which when energized is operative to move the pinion into mesh with the ring gear and means for moving the pinion out of mesh with the ring gear when the solenoid is deenergized.

4. Starting apparatus for cranking an internal combustion engine comprising, an electric cranking motor, a shaft connected to the armature of said cranking motor, a ring gear connected to said engine, a pinion which is adapted to be meshed with the ring gear of said engine, a speed responsive clutch connected between said pinion and said shaft for connecting and disconnecting said shaft and pinion, said clutch comprising a first clutch member connected to said shaft to rotate therewith and a second clutch member connected to said pinion, said second clutch member having a portion thereof disposed within said first clutch member, a plurality of flyweights pivotally connected to said first clutch member, said flyweights pivoting toward or away from said portion of said second clutch member, and spring means for urging said flyweights into clutching engagement with said portion of said second clutch member, the force of said spring means being such as to maintain said flyweights in clutching engagement with said portion of said second clutch member when said engine is being cranked by said cranking motor at cranking speed, said flyweights pivoting radially outwardly by centrifugal force against the force of said spring means to a position where they do not engage said portion of said second clutch member when said engine starts and drives said first clutch member at a speed that is higher than the speed that it is driven during engine cranking.

5. The starting apparatus according to claim 4 where said shaft is connected to said armature through gear reduction gearing that causes said shaft to rotate at a slower speed than the speed of rotation of said armature when said armature is rotating to crank the engine.

6. The starting apparatus according to claim 4 which includes a solenoid which when energized is operative to move the pinion into mesh with the ring gear and means for moving the pinion out of mesh with the ring gear when the solenoid is deenergized.

* * * * *